US012644011B2

(12) United States Patent
Sakata et al.

(10) Patent No.: US 12,644,011 B2
(45) Date of Patent: Jun. 2, 2026

(54) PHOTOCURABLE RESIN COMPOSITION FOR THREE-DIMENSIONAL PHOTOFABRICATION

(71) Applicant: TOKUYAMA DENTAL CORPORATION, Tokyo (JP)

(72) Inventors: Eibu Sakata, Tokyo (JP); Kei Nakashima, Tokyo (JP)

(73) Assignee: TOKUYAMA DENTAL CORPORATION, Tokyo (JP)

( * ) Notice: Subject to any disclaimer, the term of this patent is extended or adjusted under 35 U.S.C. 154(b) by 55 days.

(21) Appl. No.: 18/859,422

(22) PCT Filed: Apr. 10, 2023

(86) PCT No.: PCT/JP2023/014581
§ 371 (c)(1),
(2) Date: Oct. 23, 2024

(87) PCT Pub. No.: WO2023/210328
PCT Pub. Date: Nov. 2, 2023

(65) Prior Publication Data
US 2025/0282974 A1 Sep. 11, 2025

(30) Foreign Application Priority Data

Apr. 25, 2022 (JP) ................................. 2022-071842

(51) Int. Cl.
| | |
|---|---|
| *C09D 135/02* | (2006.01) |
| *B33Y 10/00* | (2015.01) |
| *B33Y 70/00* | (2020.01) |
| *B33Y 80/00* | (2015.01) |
| *C08F 222/22* | (2006.01) |
| *C09D 4/00* | (2006.01) |

(52) U.S. Cl.
CPC ........... *C09D 135/02* (2013.01); *B33Y 70/00* (2014.12); *C08F 222/22* (2013.01); *C09D 4/00* (2013.01); *B33Y 10/00* (2014.12); *B33Y 80/00* (2014.12); *C08F 2800/20* (2013.01)

(58) Field of Classification Search
CPC .. C08F 220/343; C08F 220/34; C08F 220/36; C08F 2/38; C08F 222/22; C08F 2800/20; C09D 135/02; C09D 4/00; B33Y 70/00; B33Y 10/00; B33Y 80/00; B33Y 70/10; A61K 6/62; A61K 6/64; A61K 6/887; B29C 64/124
See application file for complete search history.

(56) References Cited

U.S. PATENT DOCUMENTS

| | | | | |
|---|---|---|---|---|
| 2002/0172875 A1* | 11/2002 | Hu | .......................... | G03F 7/033 |
| | | | | 430/18 |
| 2015/0069310 A1* | 3/2015 | Jung | ........................ | G02B 1/04 |
| | | | | 252/586 |
| 2020/0016043 A1 | 1/2020 | Miyata et al. | | |
| 2020/0069530 A1* | 3/2020 | Jin | ......................... | A61K 6/887 |
| 2020/0390527 A1 | 12/2020 | Niwa et al. | | |
| 2021/0137796 A1* | 5/2021 | Hosokawa | ............... | A61K 6/62 |
| 2023/0096105 A1 | 3/2023 | Suzuki et al. | | |

FOREIGN PATENT DOCUMENTS

| | | |
|---|---|---|
| JP | 2016-525150 A | 8/2016 |
| JP | 2018-076455 A | 5/2018 |
| JP | 6441132 B2 | 12/2018 |
| JP | 2020100705 A | 7/2020 |
| JP | 2020-158417 A | 10/2020 |
| JP | 2021-035941 A | 3/2021 |
| JP | 2021-535251 A | 12/2021 |
| JP | 2022-041276 A | 3/2022 |
| WO | 2020/047217 A1 | 3/2020 |
| WO | 2021/177462 A1 | 9/2021 |

OTHER PUBLICATIONS

International Search Report issued in corresponding International Application No. PCT/JP2023/014581 issued May 16, 2023 (5 pages).
Written Opinion issued in corresponding International Application No. PCT/JP2023/014581 issued May 16, 2023 (3 pages).
Extended European Search Report issued in related European Application No. EP23796073.7 dated Feb. 24, 2026 (6 pages).

* cited by examiner

*Primary Examiner* — Nahida Sultana
(74) *Attorney, Agent, or Firm* — Osha Bergman Watanabe & Burton LLP

(57) ABSTRACT

Provided is a photocurable resin composition used for producing a three-dimensional formed article by a liquid tank photopolymerization method, the photocurable resin composition containing (A) a radically polymerizable monomer, (B) an inorganic filler, (C) a photopolymerization initiator, (D) an activated light absorbent, (E) a polymerization inhibitor, and (F) a chain transfer agent, wherein: at least 90 mass % of the component (A) has two or more (meth) acryloyl groups in the molecule, and is composed of a polyfunctional (meth)acrylate-based radically polymerizable monomer (a) having 5 to 25 atoms constituting a main chain of a divalent group interposed between the two or more (meth)acryloyl groups; and the component (a) is composed of a polyfunctional monomer a1 having a specific group such as a urethane group and a polyfunctional monomer a2 other than the polyfunctional monomer a1. Also provided is a method for producing a three-dimensional photoformed article by using the photocurable resin composition.

5 Claims, No Drawings

PHOTOCURABLE RESIN COMPOSITION FOR THREE-DIMENSIONAL PHOTOFABRICATION

TECHNICAL FIELD

The invention relates to a photocurable resin composition for use in three-dimensional photofabrication.

BACKGROUND ART

A technique of producing a three-dimensional photofabricated product by curing a photocurable resin composition by irradiation with light is known as three-dimensional photofabrication. Among the three-dimensional photofabrication processes, there are widely known a vat photopolymerization process where a photocurable resin composition placed in a vat-shaped container is irradiated with light to achieve the fabrication and a material jetting process where a photocurable resin composition is ejected by an ink-jet printer and the ejected photocurable resin composition is concurrently irradiated with light to achieve the fabrication.

In the dental field, dental restorations such as dentures and crown prostheses need to be produced highly precisely such that the dental restorations have a unique shape in accordance with the situation in the oral cavity of each individual patient, and three-dimensional photofabrication based on computer aided design (CAD) data designed on the basis of digital data obtained by oral scanning or the like can easily produce a three-dimensional photofabricated product that reproduces the designed shape with high precision. However, cracks may be generated in the interior and/or on the surface of the three-dimensional photofabricated product due to stresses caused between fabricated layers by shrinkage that occur during the three-dimensional photofabrication and deformation associated therewith. In particular, when an inorganic filler is added to a photocurable resin composition for three-dimensional photofabrication for the purpose of improving mechanical strength, cracks are likely to be generated due to polymerization shrinkage. In addition, a diffuse reflection of laser light irradiated on the inorganic filler may degrade accuracy of the resulting three-dimensional photofabricated product.

Therefore, solutions for suppressing the occurrence of such a problem have been studied. For example, Patent Document 1 describes "a preparing method of a dental three-dimensional modeled object, wherein the method does not comprise a step of a final curing, by a light and/or heating type post-curing device, a dental three-dimensional modeled object modeled by any stereolithography-type three-dimensional printing machine under recommended conditions, using 'a dental stereolithography-type three-dimensional printing material comprising at least one or more (a) monofunctional acrylate monomer having an aromatic ring and (b) photopolymerization initiator, wherein an electronegativity difference between adjacent atoms which are bonded by covalent bond in all atoms constituting the (a) monofunctional acrylate monomer having an aromatic ring is less than 1.00'".

Patent Document 2 describes, as a composition suitable for producing denture bases and a set of artificial teeth by three-dimensional (3D) printing, "a composition comprising: a light-curable viscous mixture comprising: 0 to 50% by weight of a solution having a polymerized poly(methyl methacrylate) dissolved in methyl methacrylate monomer solvent; 5 to 20% by weight of at least one kind of polyfunctional aliphatic (meth)acrylate; 5 to 40% by weight of at least one kind of aliphatic urethane (meth)acrylate oligomer; 25 to 65% by weight of at least one kind of difunctional bisphenol-A dimethacrylate; 0.1 to 5% by weight of at least one kind of a photoinitiator; 0.05 to 2% by weight of at least one kind of light stabilizer; and 0.1 to 3% by weight of color pigment based on the total weight of the composition".

Furthermore, in relation to a technique for suppressing polymerization shrinkage, without limitation to the dental field, Patent Document 3 describes "a composition for optical stereolithography comprising: (A) a cationically-polymerizable aromatic compound having two or more aromatic rings and three or more glycidyl ether structures; (B) a cationically-polymerizable aliphatic compound having one or more alcoholic hydroxyl groups and two or more glycidyl ether structures and/or a cationically-polymerizable compound having an oxetane group; (C) a radically-polymerizable compound having one or more alcoholic hydroxyl groups and two or more methacrylic and/or acrylic groups; (D) a cationic polymerization initiator which is a sulfonium compound or a bis(alkylphenyl)iodonium compound; (E) a radical polymerization initiator; and (F) a sensitizer, wherein the composition comprises 10 to 50 mass % of the (A) cationically-polymerizable aromatic compound, 1 to 30 mass % of the (B) cationically-polymerizable aliphatic compound and/or cationically-polymerizable compound having an oxetane group, 10 to 40 mass % of the (C) radically-polymerizable compound, 0.1 to 20% by mass of the (D) cationic polymerization initiator, 0.1 to 20% by mass of the (E) radical polymerization initiator, and 0.05 to 5% by mass of the (F) sensitizer".

As a technique for reducing stresses during polymerization shrinkage, Patent Document 4 describes "reducing the shrinkage stress during polymerization by adding, as a chain transfer agent, (E) an α-alkylstyrene compound to a dental polymerizable composition composed of (A) a radically-polymerizable monomer, (B) an α-diketone compound, (C) an amine compound, and (D) a photoacid generator in an amount of 0.1 to 0.5 parts by mass relative to 100 parts by mass of the (A) radically-polymerizable monomer".

CITATION LIST

Patent Document

Patent Document 1: Japanese Unexamined Patent Application, Publication No. 2020-158417
Patent Document 2: Japanese Unexamined Patent Application, Publication No. 2016-525150
Patent Document 3: Japanese Unexamined Patent Application, Publication No. 2018-76455
Patent Document 4: Japanese Patent No. 6441132

DISCLOSURE OF THE INVENTION

Problems to be Solved by the Invention

According to the technique described in Patent Document 1, in the production of a dental three-dimensional modeled object such as a dental prosthesis by a stereolithography-type three-dimensional printing machine, a dental three-dimensional modeled object having excellent dimensional accuracy can be reportedly obtained by achieving a high degree of polymerization in a manufacturing stage (shaping step).

However, the three-dimensional stereolithographic method actually employed in Patent Document 1 is a material jetting method employing an ink jet printing, and the dental stereolithography-type three-dimensional printing material used therein contains no or an extremely small amount of, if any, inorganic filler. Therefore, when this technique is used to produce a dental prosthesis, such a high mechanical strength that the dental prosthesis undergoes no break, fracture, or the like in the presence of occlusal pressure, etc. in use is difficult to realize.

In the composition described in Patent Document 2, the reduction of an amount of shrinkage during the photofabrication and the suppression of cracks in the interior and on the surface of the three-dimensional photofabricated product are achieved by adding polymerized poly(methyl methacrylate), specifically, polymethylmethacrylate having a molecular weight of 10,000 or more. However, the addition of such a polymer component to the composition tends to decrease the strength of the three-dimensional photofabricated product. Further, such addition also tends to increase the viscosity of the composition; thus, when an inorganic filler is added to achieve high strength, the viscosity of the composition greatly increases, leading to difficulty in handling.

Furthermore, in the composition for optical stereolithography described in Patent Document 3, the reduction of the polymerization shrinkage is intended by using the radically-polymerizable monomer and the cationically-polymerizable monomers in combination, but the cationic polymerization system is susceptible to moisture, and the manufacturing may be difficult depending on the storage environment of the composition and the environment during the manufacturing. In addition, when an inorganic filler is added to achieve high strength, the interaction with the inorganic filler makes the manufacturing difficult.

Therefore, an object of the present invention is to provide a photocurable resin composition for three-dimensional photofabrication that contains a large amount of an inorganic filler for achieving high strength, and that gives a highly precisely three-dimensional photofabricated product with high-strength without adding a polymer component or using a cationically-polymerizable monomer as a polymerizable monomer (monomeric) component.

Means for Solving the Problems

Specific means for solving the above-mentioned object include the following embodiments.

<1> A photocurable resin composition for use in three-dimensional photofabrication for producing a stack having a shape corresponding to a shape of a three-dimensional object by digitizing and ordinating the three-dimensional object in a height direction of the three-dimensional object and generating two-dimensional shape data indicating a cross-sectional shape of the three-dimensional object at each ordinated height, based on three-dimensional shape data indicating the shape of the three-dimensional object, and sequentially forming and stacking fabricated layers each having a shape corresponding to a two-dimensional shape at each height based on the two-dimensional shape data, according to an order of the ordinating, using a vat photopolymerization process in which a predetermined position of a liquid photocurable resin composition held in a vat is irradiated with activating light being ultraviolet light or visible light to selectively cure the liquid photocurable resin composition present in the position; the composition including: 100 parts by mass of a radically-polymerizable monomer (A); 5.0 to 400 parts by mass of an inorganic filler (B); 0.05 to 5.0 parts by mass of a photopolymerization initiator (C) that absorbs the activating light to generate a radical;

0.01 to 2.5 parts by mass of an activating light absorbent (D) that absorbs the activating light;

0.01 to 5.0 parts by mass of a polymerization inhibitor (E); and 0.005 to 1.0 part by mass of a chain transfer agent (F), 90% by mass or more of the radically-polymerizable monomer (A) being composed of a polyfunctional (meth)acrylate type radically-polymerizable monomer (a) having two or more (meth)acryloyl groups in a molecule and having 5 to 25 atoms constituting a main chain of a divalent group interposed between the two or more (meth)acryloyl groups present in the molecule; and the polyfunctional (meth)acrylate type radically-polymerizable monomer (a) being composed of 40 parts by mass or more and less than 90 parts by mass of a polyfunctional (meth)acrylate type radically-polymerizable monomer (a1) having at least one group selected from the group consisting of a urethane group, an isocyanurate group, and a urea group, and 10 parts by mass or more and less than 60 parts by mass of another polyfunctional (meth)acrylate type radically-polymerizable monomer (a2).

<2> The photocurable resin composition according to <1>, in which the chain transfer agent (F) includes an α-methylstyrene dimer.

<3> The photocurable resin composition according to <1> or <2>, further including 0.001 to 1.0 part by mass of a thermal polymerization initiator (G).

<4> A method for producing a three-dimensional photofabricated product, the method including:

digitizing and ordinating a three-dimensional object in a height direction of the three-dimensional object and generating two-dimensional shape data indicating a cross-sectional shape of the three-dimensional object at each ordinated height, based on three-dimensional shape data indicating a shape of the three-dimensional object; and producing the three-dimensional photofabricated product using a vat photopolymerization process in which a predetermined position of a liquid photocurable resin composition held in a vat is irradiated with activating light being ultraviolet light or visible light to selectively cure the liquid photocurable resin composition present in the position, and the method using the photocurable resin composition according to any one of <1> to <3> as the liquid photocurable resin composition.

<5> The method for producing a three-dimensional photofabricated product according to <4>, in which a dental restoration is produced as the three-dimensional photofabricated product.

Effects of the Invention

A photocurable resin composition of the present invention can be used to perform a vat photopolymerization process to obtain a three-dimensional photofabricated product with excellent mechanical strength, good shape accuracy, and substantially no internal cracks.

PREFERRED MODE FOR CARRYING OUT THE INVENTION

<Photocurable Resin Composition>

A photocurable resin composition according to the present embodiment is a photocurable resin composition for use in three-dimensional photofabrication for obtaining a stack having a shape corresponding to a shape of a three-dimensional object using a vat photopolymerization process, the composition including: 100 parts by mass of a radically-polymerizable monomer (A); 5.0 to 400 parts by mass of an inorganic filler (B); 0.05 to 5.0 parts by mass of a photopolymerization initiator (C) that absorbs activating light to generate a radical; 0.01 to 2.5 parts by mass of an activating light absorbent (D) that absorbs activating light; 0.01 to 5.0 parts by mass of a polymerization inhibitor (E); and 0.005 to 1.0 part by mass of a chain transfer agent (F), 90% by mass or more of the radically-polymerizable monomer (A) being composed of a polyfunctional (meth)acrylate type radically-polymerizable monomer (a) having two or more (meth) acryloyl groups in a molecule and having 5 to 25 atoms constituting a main chain of a divalent group interposed between the two or more (meth)acryloyl groups present in the molecule; and the polyfunctional (meth)acrylate type radically-polymerizable monomer (a) being composed of 40 parts by mass or more and less than 90 parts by mass of a polyfunctional (meth)acrylate type radically-polymerizable monomer (a1) having at least one group selected from the group consisting of an urethane group, an isocyanurate group, and an urea group (hereinafter also referred to as "polyfunctional monomer a1"), and 10 parts by mass or more and less than 60 parts by mass of another polyfunctional (meth)acrylate type radically-polymerizable monomer (a2) (hereinafter also referred to as "polyfunctional monomer a2").

As described above, when the vat photopolymerization method is used to produce a three-dimensional photofabricated product, as a method for suppressing deformation caused by polymerization shrinkage during three-dimensional photofabrication, a method of adding a polymer component and a method of using a cationically-polymerizable monomer as a polymerizable monomer (monomeric) component have been known. However, such methods cannot be applied to production of a three-dimensional photofabricated product, such as a dental restoration, which contains a large amount of an inorganic filler for achieving high strength and is expected to be used under specific environmental conditions. The present inventors conducted studies and have also found that addition of an inorganic filler may cause laser light from a three-dimensional photofabrication device to be scattered, thereby reducing modeling accuracy of the resulting three-dimensional photofabricated product. Under such circumstances, the inventors conducted various studies on a system in which a chain transfer agent is added to a photocurable resin composition including a polymerizable monomer composed of a radically-polymerizable monomer (as described in Patent Document 4), with the expectation of reducing shrinkage stress during photofabrication. As a result, it was found that generation of cracks may not be prevented even when the chain transfer agent is added, and that, even when generation of cracks can be prevented, some systems may cause insufficient cure, resulting in insufficient mechanical strength and distortion of the resulting three-dimensional photofabricated product. The present inventors further examined an effect of the radically-polymerizable monomer component in the system with the addition of the chain transfer agent, and have found that the above problems can be solved by using a monomer including the above-mentioned polyfunctional (meth)acrylate type radically-polymerizable monomer (a) as a main component and a certain amount of the above-mentioned polyfunctional monomer a1. Thus, the present invention has been completed.

The reason for obtaining such an effect is not known exactly, but the present inventors speculate as follows.

When a fabricated layer using a three-dimensional photofabrication device, a bonded portion of a fabricated layer in a stack (a plurality of the fabricated layers is stacked) obtained by photocuring (also referred to as "primary curing") has a lower polymerization rate than other portions. When an inorganic filler is included, a portion in which irradiation intensity of laser light is reduced due to light scattering has a lower polymerization rate than in other portions. Therefore, when the stack is immersed in a solvent for the purpose of cleaning, solvent cracks may be generated due to solvent penetration into the portion with a lower polymerization rate. Cracks are also thought to be caused by non-uniform polymerization shrinkage that occurs during secondary curing of the stack. A chain transfer of a radical caused by adding the chain transfer agent can reduce non-uniformity of the polymerization rate in some portions as described above. However, due to suppressed growth of a polymer chain, insufficient curing is caused after a short period of light irradiation, distortion occurs during secondary curing, and accuracy is easily reduced. It is presumed that, in a photocurable resin composition according to the present embodiment, an effect of suppressing the nonuniformity of the polymerization rate by the chain transfer reaction and higher strength due to formation of a cross-linked structure can be balanced since 90% by mass or more of the monomer component is composed of a polyfunctional (meth)acrylate type radically-polymerizable monomer (a) in which two or more (meth)acrylate groups are apart from each other at a moderate distance in a molecule, and a certain amount of a polyfunctional monomer a1 having at least one group selected from the group consisting of a urethane group, an isocyanurate group, and a urea group, which is a monomer considered to be relatively less likely to cause a chain transfer reaction among the polyfunctional (meth) acrylate type radically-polymerizable monomer (a), is included. As a result, the above-mentioned effect is achieved.

A photocurable resin composition according to the present embodiment is a photocurable resin composition to be used for producing a three-dimensional object using a vat photopolymerization process, and exhibits the above-mentioned excellent effect when used for such applications.

As used herein, a vat photopolymerization process means a method for producing a three-dimensional photofabricated product having a shape corresponding to a shape of a three-dimensional object, the method including digitizing and ordinating the three-dimensional object in a height direction of the three-dimensional object and generating two-dimensional shape data indicating a cross-sectional shape of the three-dimensional object at each ordinated height, based on three-dimensional shape data indicating the shape of the three-dimensional object; irradiating a predetermined position of a liquid photocurable resin composition held in a vat with activating light being ultraviolet light or visible light to selectively (primarily) cure the liquid photocurable resin composition present in the position; and sequentially forming and stacking fabricated layers each having a shape corresponding to a two-dimensional shape at each height based on the two-dimensional shape data, according to an order of the ordinating, to thereby obtain a stack having the shape corresponding to a shape of a three-dimensional object (hereinafter also referred to as "shaping step"); and optionally subjecting the stack to a washing treatment or a secondary curing treatment.

Although it has been well known, as a photocurable resin composition for a vat photopolymerization process, those containing a radically-polymerizable monomer (A), a photopolymerization initiator (C) that absorbs activating light to generate a radical, and a polymerization inhibitor (E), a photocurable resin composition according to the present embodiment is significantly characterized in that an inorganic filler (B) is incorporated into such a composition to increase strength of the resulting three-dimensional photofabricated product; a chain transfer agent (F) is incorporated into the composition to suppress an adverse effect caused by incorporation of the inorganic filler; and furthermore, a specific polyfunctional monomer is used as the radically-polymerizable monomer (A).

Components contained in a photocurable resin composition according to the present embodiment will be described. It should be noted that in this specification, the expression "x to y" using numerical values x and y is intended to mean "x or more and y or less" unless otherwise specified. When only the numerical value y is described with its unit in such a notation, the unit shall also be applied to the numerical value x. Further, in this specification, the term "(meth)acryloyl" means both "acryloyl" and "methacryloyl". Similarly, the term "(meth)acrylate" means both "acrylate" and "methacrylate".

[Radically-Polymerizable Monomer (a)]

A radically-polymerizable monomer (A) contained in a photocurable resin composition according to the present embodiment needs to include a polyfunctional monomer a1 having at least one group selected from the group consisting of a urethane group, an isocyanurate group, and a urea group and another polyfunctional monomer a2 as a polyfunctional (meth)acrylate type radically-polymerizable monomer (a) having two or more (meth)acryloyl groups in a molecule and having 5 to 25 (preferably 10 to 20) atoms constituting a main chain of a divalent group interposed between the two or more (meth)acryloyl groups present in the molecule. As used herein, "5 to 25 atoms constituting a main chain of a divalent group" means that a number of atoms constituting a main chain of each of all "divalent groups" interposed between two (meth)acryloyl groups adjacent to each other in a molecule is 5 to 25. For example, it means that, when a number of (meth)acryloyl groups present in a molecule is 3, there will be two "divalent groups" mentioned above and a number of atoms constituting a main chain is 5 to 25 for both of the two "divalent groups". Note that, when the "divalent group" contains a ring structure in a main chain, specifically, when a ring structure is introduced into a main chain by a bond that presents in each of two ring member atoms, a path with a smaller number of ring member atoms present between the two ring member atoms shall be considered as part of the main chain and used for counting a number of atoms constituting the main chain.

Furthermore, based on a total mass of a radically-polymerizable monomer (A) contained in a photocurable resin composition according to the present embodiment, 90% by mass or more should be polyfunctional (meth)acrylate type radically-polymerizable monomer (a), 40% by mass or more and less than 90% by mass should be a polyfunctional monomer a1, and 10% by mass or more and less than 60% by mass should be a polyfunctional monomer a2.

In other words, when a photocurable resin composition according to the present embodiment contains 100 parts by mass of a radically-polymerizable monomer (A), a content of a polyfunctional monomer a1 should be 40% by mass or more and less than 90% by mass, a content of a polyfunctional monomer a2 should be 10% by mass or more and less than 60% by mass, and a total content of the polyfunctional monomer a1 and the polyfunctional monomer a2 should be 90 parts by mass or more. From the viewpoint of the effect, when a photocurable resin composition according to the present embodiment contains 100 parts by mass of a radically-polymerizable monomer (A), a content of a polyfunctional monomer a1 is preferably 45 parts by mass or more and less than 85 parts by mass and more preferably 48 parts by mass or more and less than 82 parts by mass, and a content of a polyfunctional monomer a2 is preferably 15 parts by mass or more and less than 55 parts by mass and more preferably 18 parts by mass or more and less than 52 parts by mass, and a total content of the polyfunctional monomer a1 and the polyfunctional monomer a2 is preferably 95 parts by mass or more and more preferably 100 parts by mass.

Examples of a compound that can be suitably used as a polyfunctional monomer a1 include a urethane group-containing (meth)acrylate such as 1,6-bis(methacryloyoxy-2-ethoxycarbonylamino)-2,2,4-trimethylhexane, 1,6-bis(methacryloyoxy-2-ethoxycarbonylamino)-2,4,4-trimethylhexane, a phenylglycidyl ether-(meth)acrylate hexamethylene diisocyanate urethane prepolymer, a pentaerythritol tri(meth)acrylate hexamethylene diisocyanate urethane prepolymer, a pentaerythritol tri(meth)acrylate isophorone diisocyanate urethane prepolymer, or a dipentaerythritol penta(meth)acrylate hexamethylene diisocyanate urethane prepolymer; an isocyanate skeleton-containing (meth)acrylate such as tris(2-methacryloyloxyethyl)isocyanurate, caprolactone-modified tris-(2-acryloxyethyl)isocyanurate, caprolactone-modified tris-(2-acryloxyethyl)isocyanurate; or the like. Among them, 1,6-bis(methacryloyoxy-2-ethoxycarbonylamino)-2,2,4-trimethylhexane, 1,6-bis(methacryloyoxy-2-ethoxycarbonylamino)-2,4,4-trimethylhexane, or caprolactone modified tris-(2-acryloxyethyl)isocyanurate is preferred from the viewpoints of low viscosity and high strength.

Examples of a compound that can be suitably used as a polyfunctional monomer a2 include bisphenol A skeleton-containing (meth)acrylate such as 2,2'-bis{4-[3-(meth)acryloyloxy-2-hydroxypropoxy]phenyl}propane, 2,2'-bis[4-(meth)acryloyloxyphenyl]propane, or 2,2'-bis[4-(meth)acryloyloxypolyethoxyphenyl]propane; ethylene glycol (meth)acrylate such as triethylene glycol dimethacrylate or ethylene glycol dimethacrylate; aliphatic di(meth)acrylate such as 1,3-propanediol di(meth)acrylate or 1,9-nonanediol dimethacrylate; trifunctional (meth)acrylate such as trimethylolpropane trimethacrylate; or the like. Among them, 2,2'-bis[4-(meth)acryloyloxyphenyl]propane, 2,2'-bis[4-(meth)acryloyloxypolyethoxyphenyl]propane, or triethylene glycol dimethacrylate is preferred from the viewpoints of low viscosity and high strength.

Note that, when a radically-polymerizable monomer (A) includes a radically-polymerizable monomer other than a polyfunctional monomer a1 and a polyfunctional monomer a2, a radically-polymerizable monomer that satisfies such conditions, preferably a (meth)acrylate type radically-polymerizable monomer, which is for use in a dental application, can be used without any restriction.

[(B) Inorganic Filler]

In order to increase mechanical strength such as rigidity of the resulting three-dimensional photofabricated product, a photocurable resin composition according to the present embodiment should contain 5.0 to 400 parts by mass of an inorganic filler (B) relative to 100 parts by mass of a radically-polymerizable monomer (A). When a content of an inorganic filler (B) is too large, a viscosity of the resulting photocurable resin composition tends to become too high. On the other hand, when a content of an inorganic filler (B) is too small, mechanical strength tends to be insufficient. For this reason, the content of an inorganic filler (B) is preferably 10 to 300 parts by mass and more preferably 20 to 200 parts by mass.

An inorganic filler (b) is not particularly limited, and for example, those for use as a filler for a tooth restoration material may be used without any restriction. Examples of an inorganic filler that can be suitably used include powder composed of (single) metal; powder composed of a metal oxide or a metal composite oxide; powder composed of a metal fluoride or a metal salt such as a carbonate, a sulfate, a silicate, a hydroxide, a chloride, a sulfite, or a phosphate; a mixture of these powders; or the like. Examples of a particularly suitable inorganic filler component include a metal oxide such as amorphous silica, quartz, alumina, titania, zirconia, barium oxide, yttrium oxide, lanthanum oxide, or ytterbium oxide; a silica-based composite oxide such as silica-zirconia, silica-titania, silica-titania-barium oxide, or silica-titania-zirconia; glass such as borosilicate glass, aluminosilicate glass, or fluoroaluminosilicate glass; a metal fluoride such as barium fluoride, strontium fluoride, yttrium fluoride, lanthanum fluoride, or ytterbium fluoride; an inorganic carbonate such as calcium carbonate, magnesium carbonate, strontium carbonate, or barium carbonate; a metal sulfate such as magnesium sulfate or barium sulfate; or the like. In the production of a dental restoration, particles of silica-zirconia, silica-titania, silica-titania-barium oxide, silica-titania-zirconia, or the like are suitably used because of their strong X-ray contrast property. Silica-zirconia particles are most preferably used from the viewpoint of wear resistance of the resulting cured product.

A particle diameter of an inorganic filler (B) is not particularly limited, and a filler having an average particle diameter of 0.01 to 100 μm (preferably 0.01 to 10 μm), which is commonly used as a tooth restoration material, may be appropriately used depending on the purposes. A plurality kind of these fillers may be used in combination, and a plurality kind of fillers with different average particle diameters may be used in combination. Furthermore, an inorganic filler (B) may be incorporated as the so-called organic-inorganic composite filler.

Incidentally, an inorganic filler (B) is desirably treated with a surface treating agent typified by a silane coupling agent in order to improve compatibility with a polymerizable monomer and improve mechanical strength and water resistance. The surface treatment may be performed according to any known method. For example, methyltrimethoxysilane, methyltriethoxysilane, methyltrichlorosilane, dimethyldichlorosilane, trimethylchlorosilane, vinyltrichlorosilane, vinyltriethoxysilane, vinyltris(β-methoxyethoxy)silane, γ-methacryloyloxypropyltrimethoxysilane, methacryloxyoctyl-8-trimethoxysilane, γ-chloropropyltrimethoxysilane, γ-glycidoxypropylmethoxysilane, hexamethyldisilazane, or the like is suitably used as a silane coupling agent.

[(C) Photopolymerization Initiator that Absorbs Activating Light Irradiated in Shaping Step]

A photopolymerization initiator (C) has a function of generating a radical by means of activating light emitted from a light source mounted on a three-dimensional photofabrication device, specifically, ultraviolet light or visible light, and causing radical polymerization of a radically-polymerizable monomer (A). Accordingly, a photopolymerization initiator (C) needs, according to a kind (wavelength) of activating light to be used, to absorb the light and generate a radical.

A content of a photopolymerization initiator (C) may be 0.05 to 5.0 parts by mass relative to 100 parts by mass of a radically-polymerizable monomer (A). When the content of a photopolymerization initiator (C) is too large, a burr etc. tends to occur in the resulting three-dimensional photofabricated product, resulting in poor modeling accuracy. On the other hand, when a content of a photopolymerization initiator (C) is too small, fabrication in a shaping step tends to be difficult. In order to allow an effective amount of a photopolymerization initiator in a stack obtained in a shaping step to remain so that the photopolymerization initiator can be utilized in secondary curing, a content of a polymerization initiator (C) is preferably 0.3 to 4.0 parts by mass, and more preferably 0.5 to 3.0 parts by mass.

Any photopolymerization initiator that satisfies the above-mentioned conditions may be appropriately selected from known photopolymerization initiators and used as a photopolymerization initiator (C). The photopolymerization initiator to be selected is not particularly limited, and examples thereof include a self-cleaving photopolymerization initiator, a bimolecularly hydrogen-abstracting photopolymerization initiator, a photoacid generator, a combination thereof, or the like. In addition, these photopolymerization initiators may be used in combination with a photosensitizing dye, an electron-donating compound, or the like.

Examples of a self-cleaving photopolymerization initiator that can be suitably used include an acylphosphine oxide compound such as diphenyl(2,4,6-trimethylbenzoyl)-phosphine oxide or phenylbis(2,4,6-trimethylbenzoyl)-phosphine oxide; a benzoketal compound, a benzyne compound, an α-aminoacetophenone compound, an α-hydroxyacetophenone compound, a titanocene compound, an acyloxime compound; or the like. Examples of a photoacid generator include an iodonium salt compound such as a p-isopropylphenyl-p-methylphenyliodonium tetrakispentafluorophenylborate salt; a sulfonium salt compound such as a dimethylphenacylsulfonium hexafluoroantimonate salt; a halomethyl group-substituted triazine compound such as 2,4,6-tris(trichloromethyl)-s-triazine; or the like. Examples of a photosensitizing dye include a ketone compound, a coumarin dye, a cyanine dye, a merocyanine dye, a thiazine dye, an azine dye, an acridine dye, a xanthene dye, a squarylium dye, a pyrylium salt dye, a fused polycyclic aromatic compound (anthracene, perylene, etc.), a thioxanthone compound, or the like. Examples of an electron donor include 4-dimethylaminobenzoic acid ester, 4-dimethylaminotoluene, p-dimethoxybenzene, 1,2,4-trimethoxybenzene, a thiophene compound, or the like.

[(D) Activating Light Absorbent that Absorbs Activating Light Irradiated in Shaping Step]

In order to prevent excessive transmission of activating light emitted from a three-dimensional photofabrication device and, in turn, deterioration of modeling accuracy of the resulting three-dimensional photofabricated product, a photocurable resin composition according to the present embodiment should contain an activating light absorbent (D) that absorbs the activating light irradiated from the three-dimensional photofabrication device in an amount of 0.01 to 2.5 parts by mass relative to 100 parts by mass of the radically-polymerizable monomer (A). When a content of an activating light absorbent (D) is too large, activating light emitted from a light source of a three-dimensional photofabrication device in a shaping step tends not to penetrate a photocurable resin composition, making it difficult to produce a three-dimensional photofabricated product. On the other hand, when a content of an activating light absorbent (D) is too small, the resulting three-dimensional photofabricated product tends to have poor modeling accuracy. For this reason, a content of an activating light absorbent (D) is preferably 0.04 to 2.5 parts by mass, more preferably 0.08 to 2.0 parts by mass, and further preferably 0.25 to 1.0 part by mass.

An activating light absorbent (D) is not particularly limited as long as it is a compound that absorbs activating light emitted from a light source mounted on a three-dimensional photofabrication device, and examples thereof include a triazole compound such as 2-(hydroxy-5-methylphenyl)-2H-benzotriazole or 2-(3-tert-butyl-2-hydroxy-5-methylphenyl)-5-chloro-2H-benzotriazole; a benzophenone compound such as 2,4-dihydroxybenzophenone or 2-hydroxy-4-methoxybenzophenone; or the like.

[(E) Polymerization Inhibitor]

A photocurable resin composition according to the present embodiment contains 0.01 to 5.0 parts by mass of a polymerization inhibitor (E) relative to 100 parts by mass of a radically-polymerizable monomer (A) for the purpose of improving its storage stability. When a content of a polymerization inhibitor (E) is too large, a photocurable resin composition tends to be cured insufficiently in a shaping step. On the other hand, when a content of a polymerization inhibitor (E) is too small, a photocurable resin composition has a lower storage stability and a three-dimensional photofabricated product tends to have poor modeling accuracy. For this reason, a content of a polymerization inhibitor (E) is preferably 0.01 to 5.0 parts by mass, more preferably 0.03 to 4.0 parts by mass, and further preferably 0.05 to 2.5 parts by mass.

A polymerization inhibitor (E) may be a compound that reacts with a radical generated in a photocurable resin composition to inactivate the radical, and examples thereof include di-tert-butyl-p-cresol, 4-methoxyphenol, or the like.

[(F) Chain Transfer Agent]

A photocurable resin composition according to the present embodiment contains 0.005 to 1.0 part by mass of a chain transfer agent (F) relative to 100 parts by mass of a radically-polymerizable monomer (A) for the purpose of reducing shrinkage stress during three-dimensional photofabrication and improving modeling accuracy of a three-dimensional photofabricated product. When a content of a chain transfer agent (F) is too small, a satisfactory crack generation inhibitory effect tends not to be achieved. On the other hand, when a content of a chain transfer agent (F) is too large, a polymerization reaction of a photocurable resin composition tends to be suppressed more than necessary. From the viewpoints of suppression of crack generation and modeling accuracy, a content of a chain transfer agent (F) is preferably 0.01 to 1.0 part by mass, more preferably 0.02 to 0.5 parts by mass, and further preferably 0.03 to 0.3 part by mass.

Examples of a chain transfer agent (F) include a thiol compound such as butanethiol, thiophenol, mercaptoethanol, octylthiol, lauryl mercaptan; an α-alkylstyrene compound such as 2,4-diphenyl-4-methyl-1-pentene (α-methylstyrene dimer), 2-phenyl-1-propene (α-methylstyrene); a halogenated hydrocarbon substituted with at least one halogen atom such as carbon tetrachloride or ethylene bromide; or the like. Among them, an α-alkylstyrene compound is preferred and an α-methylstyrene dimer is more preferred, due to their high crack generation inhibitory effect.

[Other Optional Components]

A photocurable resin composition according to the present embodiment may contain a thermal polymerization initiator (G) for the purpose of secondary curing. In this case, a thermal polymerization initiator having a 10-hour half-life temperature of 50 to 130° C. is preferably used from the viewpoint of effectively remaining in a stack without functioning during secondary curing. Examples of a thermal polymerization initiator that can be suitably used include an organic peroxide such as tert-butyl peroxylaurate or benzoyl peroxide; an azo compound such as azobutyronitrile or azobis(dimethylvaleronitrile); or the like.

When a photocurable resin composition according to the present embodiment contains a thermal polymerization initiator (G), a content thereof is usually 0.001 to 1.0 part by mass, preferably 0.005 to 0.3 parts by mass, and more preferably 0.01 to 0.1 part by mass relative to 100 parts by mass of a radically-polymerizable monomer (A).

<Method for Producing Three-Dimensional Photofabricated Product>

A method for producing a three-dimensional photofabricated product according to the present embodiment is a method for producing a three-dimensional photofabricated product, the method including digitizing and ordinating a three-dimensional object in a height direction of the three-dimensional object and generating two-dimensional shape data indicating a cross-sectional shape of the three-dimensional object at each ordinated height, based on three-dimensional shape data indicating a shape of the three-dimensional object; and producing the three-dimensional photofabricated product using a vat photopolymerization process in which a predetermined position of a liquid photocurable resin composition held in a vat is irradiated with activating light being ultraviolet light or visible light to selectively cure the liquid photocurable resin composition present in the position, and the method using the above-mentioned photocurable resin composition according to the present embodiment as the liquid photocurable resin composition.

A method for producing a three-dimensional photofabricated product according to the present embodiment includes a shaping step in which a stack having a shape corresponding to a shape of a three-dimensional object is produced by digitizing and ordinating the three-dimensional object in a height direction of the three-dimensional object and generating two-dimensional shape data indicating a cross-sectional shape of the three-dimensional object at each ordinated height, based on three-dimensional shape data indicating the shape of the three-dimensional object, and sequentially forming and stacking fabricated layers each having a shape corresponding to a two-dimensional shape at each height based on the two-dimensional shape data, according to an order of the ordinating, using a vat photopolymerization process in which a predetermined position of a photocurable resin composition according to the present embodiment in a liquid form held in a vat is irradiated with activating light being ultraviolet light or visible light to selectively cure the liquid photocurable resin composition present in the position.

In a method for producing a three-dimensional photofabricated product according to the present, the shaping step preferably includes:

a first step of irradiating a predetermined position of a photocurable resin composition held in the vat with activating light and curing the photocurable resin composition in the position, based on two-dimensional shape data at a first ordinate height in an ordinating order, to form a fabricated layer having a shape corresponding to the two-dimensional shape data, the fabricated layer being used as a prebonding layer;

a second step of moving the prebonding layer upward or downward to supply the photocurable resin composition directly above or below the prebonding layer in the vat;

a third step of irradiating a predetermined position of the photocurable resin composition supplied directly above or below the prebonding layer with activating light and curing the photocurable resin composition, based on two-dimensional shape data at a height of a next ordinate in the ordinating order following the immediately preceding step, and thereby forming a new fabricated layer having a shape corresponding to the two-dimensional shape data, and concurrently bonding the new fabricated layer to the prebonding layer, to obtain a stack having the new fabricated layer as a new prebonding layer; and a fourth step of moving the stack upward or downward to supply the photocurable resin composition directly above or below the new prebonding layer in the vat;

a cycle consisting of the third step and the fourth step is repeated using the new prebonding layer as the prebonding layer in the third step, and in the last third step, a new fabricated layer is formed based on two-dimensional shape data at a height of the last ordinate in the ordinating order to obtain a stack.

The vat photofabrication method including such shaping step can be suitably performed using a commercially available vat photofabrication device, the so-called 3D printer.

In a method for producing a three-dimensional photofabricated product according to the present embodiment, after the shaping step, the resulting stack is preferably washed with an organic solvent (such a step is also referred to as a "washing step") and then secondarily cured by additional irradiation with activating light, heat treatment, or both (such a step is also referred to as a "secondary curing step").

Examples of an organic solvent to be used in a washing step include an alcohol solvent such as ethanol, methanol, or isopropyl alcohol; a ketone solvent such as acetone and methyl ethyl ketone; an ether solvent such as diethyl ether, diisopropyl ether, tripropylene glycol monomethyl ether, or tetrahydrofuran; an amide solvent such as N-methylpyrrolidone or dimethylacetamide; a halogen solvent such as methylene chloride or chloroform; or the like. Among them, an alcohol solvent and an ether solvent are preferred from the viewpoint of high washing efficiency and an alcohol solvent is more preferred from the viewpoint of low environmental load.

When additional irradiation with activating light is performed in a secondary curing step, an irradiation wavelength is not particularly limited as long as a photopolymerization initiator (C) remaining in a stack absorbs activating light having the wavelength to generate a radical. An irradiation intensity in the additional irradiation with activating light is preferably 5 mW/cm$^2$ or more, more preferably 10 mW/cm$^2$ or more, and further more preferably 30 mW/cm$^2$ or more in order for a photopolymerization initiator (C) remaining in a stack to generate a sufficient amount of radicals. An irradiation time is not particularly limited, and is preferably 1 minute or longer, more preferably 3 minutes or longer, and further preferably 5 minutes or longer. Note that, an excessively high irradiation intensity during the additional irradiation with activating light leads to excessive heating of a three-dimensional photofabricated product, which may cause cracks. Therefore, the irradiation intensity is preferably 10,000 mW/cm$^2$ or less.

When a photocurable resin composition according to the present embodiment contains a thermal polymerization initiator (G), this can be used for secondary curing by heating. A heating temperature in this case is preferably 45 to 100° C., more preferably 50 to 90° C., and further preferably 55 to 80° C.

According to a method for producing a three-dimensional photofabricated product according to the present embodiment, a three-dimensional photofabricated product with high mechanical strength and substantially no internal cracks can be produced with high modeling accuracy. For this reason, it is particularly useful as a method for producing a dental restorative material such as a denture material or a crown restorative material.

EXAMPLES

Hereinafter, the present invention will be described more specifically by way of examples, but the present invention is not limited to these examples.

Compounds used in Examples and Comparative Examples and abbreviations thereof are shown below.

(a) Radically-Polymerizable Monomer

[Polyfunctional Monomer a1]

UDMA: Urethane dimethacrylate

A-9300-1CL: Caprolactone-modified tris-(2-acryloxy-ethyl) isocyanurate (manufactured by SHIN-NAKA-MURA CHEMICAL Co., Ltd.)

[Polyfunctional Monomer a2]

3G: Triethylene glycol dimethacrylate

D-2.6E: Bisphenol A ethylene glycol (EO) adduct dimethacrylate (average number of EQ adducts: 2.6)

[Other Radically-Polymerizable Monomers (Other Monomers)]

9G: Nonaethylene glycol dimethacrylate

1G: Monoethylene glycol dimethacrylate (B) Inorganic Filler

Filler composed of a mixture of 70 parts by mass of a filler B1 composed of an aggregate of spherical silica-zirconia (γ-methacryloyloxypropyltrimethoxysilane surface treated product) particles having an average particle diameter of 0.5 μm and 30 parts by mass of a filler B2 composed of an aggregate of spherical silica-zirconia (γ-methacryloyloxy-propyltrimethoxysilane surface treated product) particles having an average particle diameter of 0.08 μm.

(C) Photopolymerization Initiator

BTPO: Phenylbis(2,4,6-trimethylbenzoyl)phosphine oxide (D) Activating Light Absorbent SS3: 2-(3-tert-butyl-2-hydroxy-5-methylphenyl)-5-chloro-2H-benzotriazole (E) Polymerization Inhibitor HQME: Hydroquinone methyl ether BHT: Dibutylhydroxytoluene (F) Chain Transfer Agent MSD: α-methylstyrene dimer (G) Thermal Polymerization Initiator PBL: Perbutyl L

Example 1

(1) Preparation of Photocurable Resin Composition

First, 150 parts by mass of an inorganic filler (B) (mixed filler of B1/B2=70/30), 1.4 parts by mass of a photopolymerization initiator (C) composed of BTPO, 0.7 parts by mass of an activated light absorbent (D) composed of SS3, 0.2 parts by mass in total of a polymerization inhibitor (E) composed of 0.1 part by mass of HQME and 0.1 part by mass of BHT, and 0.1 part by mass of a chain transfer agent (F) composed of MSD were added to 100 parts by mass of a radically-polymerizable monomer (A) composed of a mixture of 80 parts by mass of UDMA and 20 parts by mass of 3G, stirred and mixed under red light until uniform, and then defoamed to prepare a liquid photocurable resin composition.

(2) Production of Three-Dimensional Photofabricated Product

The photocurable resin composition obtained in (1) above was supplied to a resin tray (vat) of a 3D printer (manufactured by DWS: DW029D) to produce a molded product (stack) having a stacked structure (formed of a cured product of the photocurable resin composition) of Stereolithography data (hereinafter abbreviated as "stl data") of a rectangular shape of 2.05 mm×2.05 mm×25.05 mm. The resulting molded product was then immersed in a plastic container filled with ethanol for 15 minutes, shaken gently, dried, and then subjected to additional irradiation with light (secondary curing) for 30 minutes using a UV CURING UNIT UVIS-2 (manufactured by DWS) to produce a three-dimensional photofabricated product.

(3) Evaluation of Three-Dimensional Photofabricated Product

The three-dimensional photofabricated product obtained in (2) above was used as an evaluation sample for modeling accuracy evaluation, crack evaluation, and 3-point bending fracture strength evaluation. Evaluation methods and evaluation criteria are described below.

[Modeling Accuracy Evaluation]

A length of each side of the evaluation sample was measured in 0.01 mm increments, and a value obtained by dividing the measured value by a set value (length of each side set in the stl data) at the time of fabrication by the 3D printer ("measured value/stl data set value") was calculated for each side, and an average value thereof was evaluated as an average value of modeling accuracy. As a result, the average value of modeling accuracy was 1.00.

[Crack Evaluation]

A surface of the evaluation sample, and a surface of the evaluation sample after each polishing when the surface was polished five times in 100 μm increments in a depth direction (total of 500 μm polishing) were visually observed under an optical microscope (×50) to check for crack generation and evaluated according to the following evaluation criteria. As a result, the sample was evaluated as "A".

—Evaluation Criteria—

A: No cracks are present on a surface or interior of the evaluation sample.

B: Cracks are observed only on a surface of the evaluation sample.

C: Cracks are present on a surface and interior of the evaluation sample.

[3-Point Bending Fracture Strength Evaluation]

The evaluation sample after the crack evaluation was polished with a waterproof abrasive paper 800 grit to form a prism of 2 mm×2 mm×25 mm and this specimen was mounted on a tester (manufactured by Shimadzu Corporation, Autograph AG5000D), and measured for three-point bending fracture strength thereof five times at a support span length of 20 mm and a crosshead speed of 1 mm/min. As a result, an average value of 3-point bending fracture strength was 155 MPa with a standard deviation of 4 MPa.

Examples 2 to 19 and Comparative Examples 1 to 5

Photocurable resin compositions of Examples 2 to 19 and Comparative Examples 1 to 5 were prepared in the same manner as in Example 1, except that components used in preparation of the photocurable resin compositions and their blended amounts were changed as shown in Tables 1 to 3. Thereafter, three-dimensional photofabricated products were produced in the same manner as in Example 1, except that the photocurable resin compositions prepared in Examples and Comparative Examples above were used. The resulting three-dimensional photofabricated products were evaluated in the same manner as for Example 1 and the results are shown in Table 4.

Examples 20 and 21

Photocurable resin compositions of Examples 20 and 21 were prepared in the same manner as in Example 1, except that the thermal polymerization initiator (G) of a kind and amounts shown in Table 2 is further blended in preparation of the photocurable resin compositions. Thereafter, molded products (stacks) having stacked structures were produced, subjected to a secondary curing treatment including washing and light irradiation, and then heated in a thermostat bath (manufactured by Yamato Scientific Co., Ltd., IC101) at 60° C. for 30 minutes to thereby produce three-dimensional photofabricated products in the same manner as in Example 1, except that the photocurable resin compositions prepared in Examples above were used. The resulting three-dimensional photofabricated products were evaluated in the same manner as for Example 1 and the results are shown in Table 4.

TABLE 1

| No. | (A) Radically-polymerizable monomer (Compound: part(s) by mass) Polyfunctional monomer (a1) | (A) Radically-polymerizable monomer (Compound: part(s) by mass) Polyfunctional monomer (a2) | (B) Inorganic filler (part(s) by mass) | (C) Photopolymerization initiator BTPO (part(s) by mass) | (D) Activating light absorbent SS3 (part(s) by mass) | (E) Polymerization inhibitor HOME (part(s) by mass) | (E) Polymerization inhibitor BHT (part(s) by mass) | (F) Chain transfer agent MSD (part(s) by mass) | (G) Thermal polymerization initiator PBL (part(s) by mass) |
|---|---|---|---|---|---|---|---|---|---|
| Example 1 | UDMA: 80 | 3G: 20 | 150 | 1.4 | 0.7 | 0.1 | 0.1 | 0.1 | — |
| 2 | UDMA: 80 | 3G: 20 | 150 | 1.4 | 0.7 | 0.1 | 0.1 | 0.05 | — |
| 3 | UDMA: 80 | 3G: 20 | 150 | 1.4 | 0.7 | 0.1 | 0.1 | 0.03 | — |
| 4 | UDMA: 80 | 3G: 20 | 150 | 1.4 | 0.7 | 0.1 | 0.1 | 0.01 | — |
| 5 | UDMA: 80 | 3G: 20 | 150 | 1.4 | 0.7 | 0.1 | 0.1 | 0.3 | — |

TABLE 1-continued

| No. | (A) Radically-polymerizable monomer (Compound: part(s) by mass) Polyfunctional monomer (a1) | Polyfunctional monomer (a2) | (B) Inorganic filler (part(s) by mass) | (C) Photopoly-merization initiator BTPO (part(s) by mass) | (D) Activating light absorbent SS3 (part(s) by mass) | (E) Polymerization inhibitor HOME (part(s) by mass) | (E) Polymerization inhibitor BHT (part(s) by mass) | (F) Chain transfer agent MSD (part(s) by mass) | (G) Thermal polymeri-zation initiator PBL (part(s) by mass) |
|---|---|---|---|---|---|---|---|---|---|
| 6 | UDMA: 50 A-9300-1CL: 30 | | 150 | 1.4 | 0.7 | 0.1 | 0.1 | 0.1 | — |
| 7 | UDMA: 50 A-9300-1CL: 30 | 3G: 20 | 150 | 1.4 | 0.7 | 0.1 | 0.1 | 0.05 | — |
| 8 | A-9300-1CL: 50 | D-2.6E: 30 3G: 20 | 150 | 1.4 | 0.7 | 0.1 | 0.1 | 0.1 | — |
| 9 | A-9300-1CL: 50 | D-2.6E: 30 3G: 20 | 150 | 1.4 | 0.7 | 0.1 | 0.1 | 0.05 | — |

TABLE 2

| | No. | (A) Radically-polymerizable monomer (Compound: part(s) by mass) Polyfunctional monomer (a1) | Polyfunctional monomer (a2) | (B) Inorganic filler (part(s) by mass) | (C) Photopoly-merization initiator BTPO (part(s) by mass) | (D) Activating light absorbent SS3 (part(s) by mass) | (E) Polymerization inhibitor HOME (part(s) by mass) | (E) Polymerization inhibitor BHT (part(s) by mass) | (F) Chain transfer agent MSD (part(s) by mass) | (G) Thermal polymeri-zation initiator PBL (part(s) by mass) |
|---|---|---|---|---|---|---|---|---|---|---|
| Example | 10 | UDMA: 80 | 3G: 20 | 43 | 1.4 | 0.7 | 0.1 | 0.1 | 0.1 | — |
| | 11 | UDMA: 80 | 3G: 20 | 100 | 1.4 | 0.7 | 0.1 | 0.1 | 0.1 | — |
| | 12 | UDMA: 80 | 3G: 20 | 233 | 1.4 | 0.7 | 0.1 | 0.1 | 0.1 | — |
| | 13 | UDMA: 80 | 3G: 20 | 150 | 3.0 | 0.7 | 0.1 | 0.1 | 0.1 | — |
| | 14 | UDMA: 80 | 3G: 20 | 150 | 0.3 | 0.7 | 0.1 | 0.1 | 0.1 | — |
| | 15 | UDMA: 80 | 3G: 20 | 150 | 1.4 | 2 | 0.1 | 0.1 | 0.1 | — |
| | 16 | UDMA: 80 | 3G: 20 | 150 | 1.4 | 0.02 | 0.1 | 0.1 | 0.1 | — |
| | 17 | UDMA: 80 | 3G: 20 | 150 | 1.4 | 0.7 | 1.0 | 1.0 | 0.1 | — |
| | 18 | UDMA: 80 | 3G: 20 | 150 | 1.4 | 0.7 | 2.0 | 2.0 | 0.1 | — |
| | 19 | UDMA: 80 | 3G: 20 | 150 | 1.4 | 0.7 | 0.03 | 0.03 | 0.1 | — |
| | 20 | UDMA: 80 | 3G: 20 | 150 | 1.4 | 0.7 | 0.1 | 0.1 | 0.1 | 0.1 |
| | 21 | UDMA: 80 | 3G: 20 | 150 | 1.4 | 0.7 | 0.1 | 0.1 | 0.1 | 0.01 |

TABLE 3

| | No. | (A) Radically-polymerizable monomer (Compound: part(s) by mass) Polyfunctional monomer (a1) | Polyfunctional monomer (a2) | Other monomers | (B) Inorganic filler (part(s) by mass) | (C) Photopoly-merization initiator BTPO (part(s) by mass) | (D) Activating light absorbent SS3 (part(s) by mass) | (E) Polymerization inhibitor HOME (part(s) by mass) | (E) Polymerization inhibitor BHT (part(s) by mass) | (F) Chain transfer agent MSD (part(s) by mass) |
|---|---|---|---|---|---|---|---|---|---|---|
| Comparative Example | 1 | UDMA: 80 | 3G: 20 | — | 150 | 1.4 | 0.7 | 0.1 | 0.1 | — |
| | 2 | UDMA: 50 A-9300-1CL: 30 | 3G: 20 | — | 150 | 1.4 | 0.7 | 0.1 | 0.1 | — |
| | 3 | UDMA: 10 | D-2.6E: 50 3G: 40 | — | 150 | 1.4 | 0.7 | 0.1 | 0.1 | 0.1 |
| | 4 | UDMA: 80 | — | 9G: 20 | 150 | 1.4 | 0.7 | 0.1 | 0.1 | 0.1 |
| | 5 | UDMA: 80 | — | 1G: 20 | 150 | 1.4 | 0.7 | 0.1 | 0.1 | 0.1 |

TABLE 4

| No. | | Bending strength/MPa (Standard deviation) | Average modeling accuracy | Crack evaluation |
|---|---|---|---|---|
| Example | 1 | 155 (4) | 1.00 | A |
| | 2 | 157 (5) | 1.01 | A |
| | 3 | 153 (8) | 1.03 | A |
| | 4 | 150 (10) | 1.04 | A |
| | 5 | 157 (5) | 1.01 | A |
| | 6 | 156 (5) | 1.00 | A |
| | 7 | 150 (3) | 1.01 | A |
| | 8 | 156 (5) | 1.00 | A |
| | 9 | 152 (6) | 1.01 | A |
| | 10 | 140 (7) | 1.01 | A |
| | 11 | 145 (5) | 1.01 | A |
| | 12 | 157 (7) | 1.01 | A |
| | 13 | 154 (3) | 1.02 | A |
| | 14 | 147 (2) | 1.01 | A |
| | 15 | 145 (4) | 1.00 | A |
| | 16 | 157 (6) | 1.02 | A |
| | 17 | 149 (5) | 1.00 | A |
| | 18 | 147 (3) | 1.00 | A |
| | 19 | 157 (7) | 1.01 | A |
| | 20 | 175 (6) | 1.01 | A |
| | 21 | 163 (7) | 1.01 | A |
| Comparative Example | 1 | 120 (23) | 1.10 | B |
| | 2 | 124 (30) | 1.11 | B |
| | 3 | 129 (9) | 1.02 | B |
| | 4 | 127 (12) | 1.03 | B |
| | 5 | 133 (21) | 1.04 | C |

As shown in Table 4, when the photocurable resin compositions of Examples 1 to 21 were used, three-dimensional photofabricated products having high bending strength could be obtained with high modeling accuracy, and no cracks were observed on a surface or interior of the three-dimensional photofabricated products.

On the other hand, when the photocurable resin compositions of Comparative Examples 1 and 2 which did not contain a chain transfer agent were used, modeling accuracy deteriorated and the resulting three-dimensional photofabricated products had low bending strength and cracks. When the photocurable resin composition of Comparative Example 3 including 10 parts by mass, which was less than the amount specified in the present embodiment, of the multifunctional monomer a1 was used, the resulting three-dimensional photofabricated product had low bending strength and cracks. Furthermore, when the photocurable resin compositions of Comparative Examples 4 and 5, which did not contain the multifunctional monomer a2 and contained 80% by mass to a total mass of the radically-polymerizable monomer (A), which is less than the value specified in the present embodiment, of the multifunctional monomer a1 were used, the resulting three-dimensional photofabricated products had low bending strength and cracks.

The invention claimed is:

1. A photocurable resin composition for use in three-dimensional photofabrication for producing a stack having a shape corresponding to a shape of a three-dimensional object by digitizing and ordinating the three-dimensional object in a height direction of the three-dimensional object and generating two-dimensional shape data indicating a cross-sectional shape of the three-dimensional object at each ordinated height, based on three-dimensional shape data indicating the shape of the three-dimensional object, and sequentially forming and stacking fabricated layers each having a shape corresponding to a two-dimensional shape at each height based on the two-dimensional shape data, according to an order of the ordinating, using a vat photo-polymerization process in which a predetermined position of a liquid photocurable resin composition held in a vat is irradiated with activating light being ultraviolet light or visible light to selectively cure the liquid photocurable resin composition present in the position; the composition comprising:

100 parts by mass of a radically-polymerizable monomer (A);

5.0 to 400 parts by mass of an inorganic filler (B);

0.05 to 5.0 parts by mass of a photopolymerization initiator (C) that absorbs the activating light to generate a radical;

0.01 to 2.5 parts by mass of an activating light absorbent (D) that absorbs the activating light;

0.01 to 5.0 parts by mass of a polymerization inhibitor (E); and 0.005 to 1.0 part by mass of a chain transfer agent (F), 90% by mass or more of the radically-polymerizable monomer (A) being composed of a polyfunctional (meth)acrylate type radically-polymerizable monomer (a) having two or more (meth)acryloyl groups in a molecule and having 5 to 25 atoms constituting a main chain of a divalent group interposed between the two or more (meth)acryloyl groups present in the molecule; and the polyfunctional (meth)acrylate type radically-polymerizable monomer (a) being composed of 40 parts by mass or more and less than 90 parts by mass of a polyfunctional (meth)acrylate type radically-polymerizable monomer (a1) having at least one group selected from the group consisting of a urethane group, an isocyanurate group, and a urea group, and 10 parts by mass or more and less than 60 parts by mass of another polyfunctional (meth)acrylate type radically-polymerizable monomer (a2).

2. The photocurable resin composition according to claim 1, wherein the chain transfer agent (F) comprises an α-methylstyrene dimer.

3. The photocurable resin composition according to claim 1, further comprising 0.001 to 1.0 part by mass of a thermal polymerization initiator (G).

4. A method for producing a three-dimensional photofabricated product, the method comprising:

digitizing and ordinating a three-dimensional object in a height direction of the three-dimensional object and generating two-dimensional shape data indicating a cross-sectional shape of the three-dimensional object at each ordinated height, based on three-dimensional shape data indicating a shape of the three-dimensional object; and producing the three-dimensional photofabricated product using a vat photopolymerization process in which a predetermined position of a liquid photocurable resin composition held in a vat is irradiated with activating light being ultraviolet light or visible light to selectively cure the liquid photocurable resin composition present in the position, and the method using the photocurable resin composition according to claim 1 as the liquid photocurable resin composition.

5. The method for producing a three-dimensional photofabricated product according to claim 4, wherein a dental restoration is produced as the three-dimensional photofabricated product.

* * * * *